(12) United States Patent
Hoffmann et al.

(10) Patent No.: US 9,397,808 B2
(45) Date of Patent: *Jul. 19, 2016

(54) REVERSE LINK PILOT INTEGRATED WITH BLOCK CODES

(71) Applicant: IPR Licensing, Inc., Wilmington, DE (US)

(72) Inventors: John E. Hoffmann, Indialantic, FL (US); George R. Nelson, Merritt Island, FL (US); James A. Proctor, Indialantic, FL (US); Antoine J. Rouphael, III, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,116

(22) Filed: Sep. 8, 2014

(65) Prior Publication Data
US 2014/0376539 A1    Dec. 25, 2014

Related U.S. Application Data

(63) Continuation of application No. 13/311,151, filed on Dec. 5, 2011, now Pat. No. 8,830,977, which is a continuation of application No. 12/290,755, filed on Nov. 3, 2008, now Pat. No. 8,072,958, which is a continuation of application No. 10/874,101, filed on Jun. 22, 2004, now Pat. No. 7,447,187, which is a continuation of application No. 09/728,575, filed on Nov. 30, 2000, now Pat. No. 6,804,223.

(51) Int. Cl.
| | |
|---|---|
| *H04L 5/00* | (2006.01) |
| *H04L 27/26* | (2006.01) |
| *H04B 1/707* | (2011.01) |
| *H04L 1/00* | (2006.01) |
| *H04B 7/26* | (2006.01) |

(52) U.S. Cl.
CPC .............. *H04L 5/0048* (2013.01); *H04B 1/707* (2013.01); *H04B 7/2628* (2013.01); *H04L 1/0041* (2013.01); *H04L 1/0065* (2013.01); *H04L 1/0066* (2013.01); *H04L 1/0071* (2013.01); *H04L 27/2662* (2013.01); *H04B 2201/70701* (2013.01); *H04L 27/2657* (2013.01)

(58) Field of Classification Search
None
See application file for complete search history.

(56) References Cited

U.S. PATENT DOCUMENTS

| | | | |
|---|---|---|---|
| 5,414,734 | A | 5/1995 | Marchetto et al. |
| 5,463,657 | A | 10/1995 | Rice |

(Continued)

FOREIGN PATENT DOCUMENTS

WO    99/63682    12/1999

OTHER PUBLICATIONS

QUALCOMM, "High Data Rate (HDR) Solution," CDMA by Qualcomm, LUC-TANP-06511 (Dec. 1998).

(Continued)

*Primary Examiner* — Min Jung
(74) *Attorney, Agent, or Firm* — Volpe and Koenig, P.C.

(57) ABSTRACT

A technique for encoding digital communication signals. Data symbols are augmented in pilot symbols inserted at predetermined positions. The pilot augmented sequence is then fed to a deterministic error correction block encoder, such as a turbo product coder, to output a coded sequence. The symbols in the error correction encoded sequence are then rearranged to ensure that the output symbols derived from input pilot symbols are located at regular, predetermined positions. As a result, channel encoding schemes can more easily be used which benefits from power of two length block sizes.

12 Claims, 6 Drawing Sheets

(56) References Cited

U.S. PATENT DOCUMENTS

| | | |
|---|---|---|
| 5,642,241 A | 6/1997 | Kim |
| 5,809,083 A | 9/1998 | Wright |
| 5,838,728 A | 11/1998 | Alamouti et al. |
| 5,867,478 A * | 2/1999 | Baum et al. .................. 370/203 |
| 5,901,185 A | 5/1999 | Hassan |
| 5,912,931 A * | 6/1999 | Matsumoto et al. .......... 375/340 |
| 6,097,711 A | 8/2000 | Okawa et al. |
| 6,212,220 B1 | 4/2001 | Proctor, Jr. et al. |
| 6,411,649 B1 | 6/2002 | Arslan et al. |
| 6,424,678 B1 | 7/2002 | Doberstein et al. |
| 6,535,502 B1 | 3/2003 | Brink |
| 6,545,997 B1 | 4/2003 | Bohnke et al. |
| 6,643,331 B1 | 11/2003 | Farrell et al. |
| 6,694,155 B1 | 2/2004 | Chin et al. |
| 6,721,267 B2 | 4/2004 | Hiben et al. |
| 6,804,223 B2 | 10/2004 | Hoffmann et al. |
| 6,904,079 B2 | 6/2005 | Hoffmann et al. |
| 6,977,974 B1 * | 12/2005 | Geraniotis et al. ............ 375/340 |
| 7,447,187 B2 | 11/2008 | Hoffmann et al. |
| 8,072,958 B2 | 12/2011 | Hoffmann et al. |
| 2001/0001616 A1 * | 5/2001 | Rakib et al. ................... 375/259 |
| 2001/0026599 A1 | 10/2001 | Hoffmann et al. |
| 2004/0156427 A1 | 8/2004 | Gilhousen et al. |
| 2005/0175071 A1 | 8/2005 | Hoffmann et al. |
| 2006/0007950 A1 | 1/2006 | Okumura et al. |
| 2007/0036182 A1 | 2/2007 | Okumura et al. |

OTHER PUBLICATIONS

Mobile Station-Base Station Compatibility Standard for Dual-Mode Wideband Spread Spectrum Cellular System, TIA/EIA Interim Standard, TIA/EIA/IS-95-A (Revision of TIA/EIA/IS-95), May 1995.
Mobile Station-Base Station Compatibility Standard for Dual-Mode Wideband Spread Spectrum Cellular System, TIA/EIA Interim Standard, TIA/EIA/IS-95-A (Addendum to TIA/EIA/IS-95), Superceded by TIA/EIA/95-B, May 1995.
Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

* cited by examiner

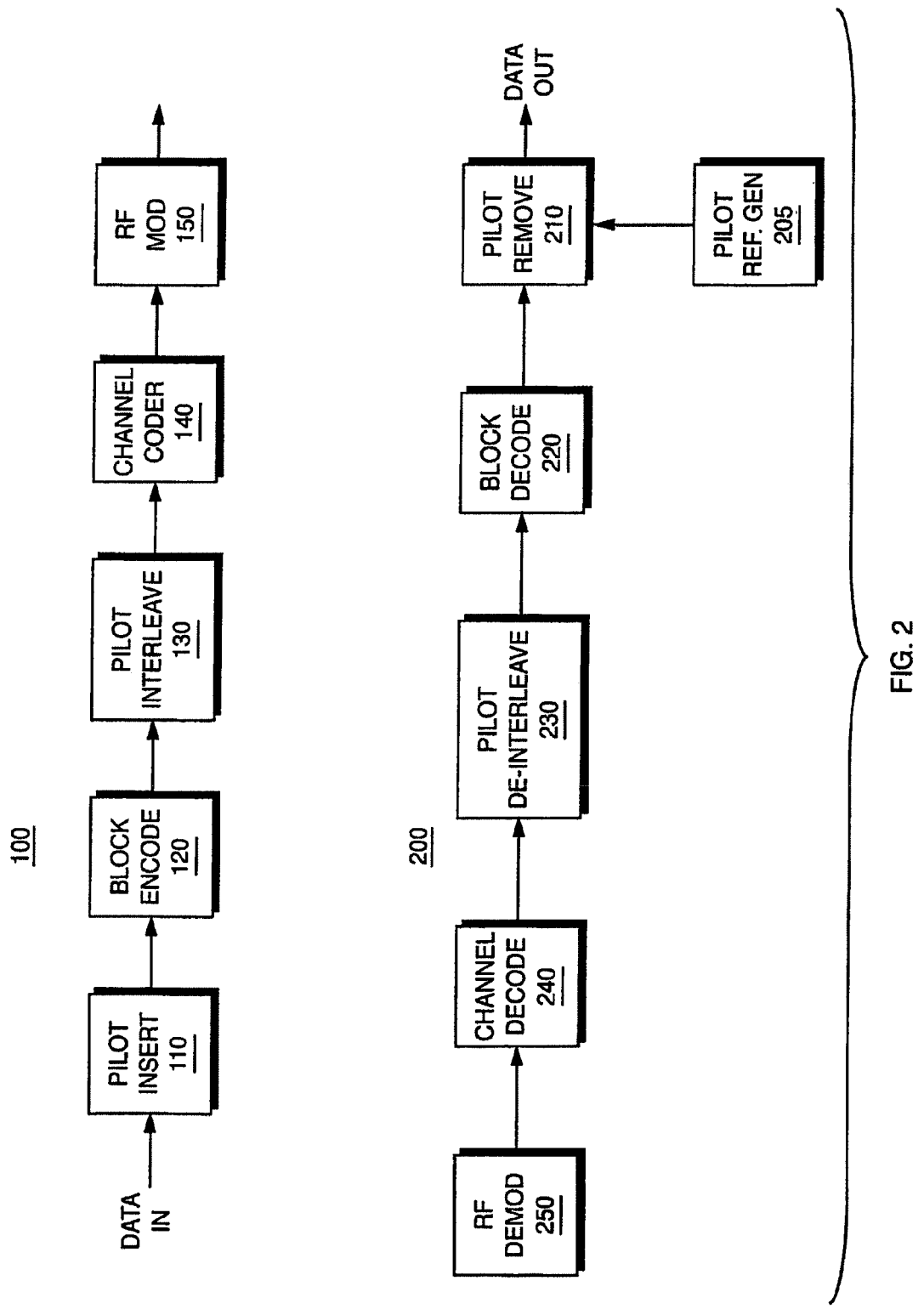

| DATA$_1$ | DATA$_2$ | DATA$_3$ | DATA$_4$ | | | | |
|---|---|---|---|---|---|---|---|
| DATA$_5$ | DATA$_6$ | DATA$_7$ | DATA$_8$ | | | | |
| DATA$_9$ | DATA$_{10}$ | DATA$_{11}$ | DATA$_{12}$ | | | | |
| DATA$_{13}$ | DATA$_{14}$ | DATA$_{15}$ | DATA$_{16}$ | | | | |
| | | | | | | | |
| | | | | | | | |
| | | | | | | | |
| | | | | | | | |

FIG. 3A

| DATA$_1$ | DATA$_2$ | DATA$_3$ | DATA$_4$ | PARITY$_1$ | PARITY$_2$ | PARITY$_3$ | PARITY$_4$ |
|---|---|---|---|---|---|---|---|
| DATA$_5$ | DATA$_6$ | DATA$_7$ | DATA$_8$ | PARITY$_5$ | PARITY$_6$ | PARITY$_7$ | PARITY$_8$ |
| DATA$_9$ | DATA$_{10}$ | DATA$_{11}$ | DATA$_{12}$ | PARITY$_9$ | PARITY$_{10}$ | PARITY$_{11}$ | PARITY$_{12}$ |
| DATA$_{13}$ | DATA$_{14}$ | DATA$_{15}$ | DATA$_{16}$ | PARITY$_{13}$ | PARITY$_{14}$ | PARITY$_{15}$ | PARITY$_{16}$ |
| PARITY$_{17}$ | PARITY$_{18}$ | PARITY$_{19}$ | PARITY$_{20}$ | PARITY$_{21}$ | PARITY$_{22}$ | PARITY$_{23}$ | PARITY$_{24}$ |
| PARITY$_{25}$ | PARITY$_{26}$ | PARITY$_{27}$ | PARITY$_{28}$ | PARITY$_{29}$ | PARITY$_{30}$ | PARITY$_{31}$ | PARITY$_{32}$ |
| PARITY$_{33}$ | PARITY$_{34}$ | PARITY$_{35}$ | PARITY$_{36}$ | PARITY$_{37}$ | PARITY$_{38}$ | PARITY$_{39}$ | PARITY$_{40}$ |
| PARITY$_{41}$ | PARITY$_{42}$ | PARITY$_{43}$ | PARITY$_{44}$ | PARITY$_{45}$ | PARITY$_{46}$ | PARITY$_{47}$ | PARITY$_{48}$ |

FIG. 3B

| PILOT$_1$ | DATA$_1$ | DATA$_2$ | DATA$_3$ | | | | |
|---|---|---|---|---|---|---|---|
| PILOT$_2$ | DATA$_4$ | DATA$_5$ | DATA$_6$ | | | | |
| PILOT$_3$ | DATA$_7$ | DATA$_8$ | DATA$_9$ | | | | |
| PILOT$_4$ | DATA$_{10}$ | DATA$_{11}$ | DATA$_{12}$ | | | | |
| | | | | | | | |
| | | | | | | | |
| | | | | | | | |
| | | | | | | | |

FIG. 3C

| PILOT$_1$ | DATA$_1$ | DATA$_2$ | DATA$_3$ | PARITY$_1$ | PARITY$_2$ | PARITY$_3$ | PARITY$_4$ |
|---|---|---|---|---|---|---|---|
| PILOT$_2$ | DATA$_4$ | DATA$_5$ | DATA$_6$ | PARITY$_5$ | PARITY$_6$ | PARITY$_7$ | PARITY$_8$ |
| PILOT$_3$ | DATA$_7$ | DATA$_8$ | DATA$_9$ | PARITY$_9$ | PARITY$_{10}$ | PARITY$_{11}$ | PARITY$_{12}$ |
| PILOT$_4$ | DATA$_{10}$ | DATA$_{11}$ | DATA$_{12}$ | PARITY$_{13}$ | PARITY$_{14}$ | PARITY$_{15}$ | PARITY$_{16}$ |
| PARITY$_{17}$ | PARITY$_{18}$ | PARITY$_{19}$ | PARITY$_{20}$ | PARITY$_{21}$ | PARITY$_{22}$ | PARITY$_{23}$ | PARITY$_{24}$ |
| PARITY$_{25}$ | PARITY$_{26}$ | PARITY$_{27}$ | PARITY$_{28}$ | PARITY$_{29}$ | PARITY$_{30}$ | PARITY$_{31}$ | PARITY$_{32}$ |
| PARITY$_{33}$ | PARITY$_{34}$ | PARITY$_{35}$ | PARITY$_{36}$ | PARITY$_{37}$ | PARITY$_{38}$ | PARITY$_{39}$ | PARITY$_{40}$ |
| PARITY$_{41}$ | PARITY$_{42}$ | PARITY$_{43}$ | PARITY$_{44}$ | PARITY$_{45}$ | PARITY$_{46}$ | PARITY$_{47}$ | PARITY$_{48}$ |

FIG. 3D

| PILOT$_1$ | DATA$_1$ | DATA$_2$ | DATA$_3$ | PARITY$_1$ | PARITY$_2$ | PARITY$_3$ | PARITY$_4$ |
|---|---|---|---|---|---|---|---|
| DATA$_4$ | DATA$_5$ | DATA$_6$ | PARITY$_5$ | PARITY$_6$ | PARITY$_7$ | PARITY$_8$ | DATA$_7$ |
| PILOT$_2$ | DATA$_8$ | DATA$_9$ | PARITY$_9$ | PARITY$_{10}$ | PARITY$_{11}$ | PARITY$_{12}$ | DATA$_{10}$ |
| DATA$_{11}$ | DATA$_{12}$ | PARITY$_{13}$ | PARITY$_{14}$ | PARITY$_{15}$ | PARITY$_{16}$ | PARITY$_{17}$ | PARITY$_{18}$ |
| PILOT$_3$ | PARITY$_{19}$ | PARITY$_{20}$ | PARITY$_{21}$ | PARITY$_{22}$ | PARITY$_{23}$ | PARITY$_{24}$ | PARITY$_{25}$ |
| PARITY$_{26}$ | PARITY$_{27}$ | PARITY$_{28}$ | PARITY$_{29}$ | PARITY$_{30}$ | PARITY$_{31}$ | PARITY$_{32}$ | PARITY$_{33}$ |
| PILOT$_4$ | PARITY$_{34}$ | PARITY$_{35}$ | PARITY$_{36}$ | PARITY$_{37}$ | PARITY$_{38}$ | PARITY$_{39}$ | PARITY$_{40}$ |
| PARITY$_{41}$ | PARITY$_{42}$ | PARITY$_{43}$ | PARITY$_{44}$ | PARITY$_{45}$ | PARITY$_{46}$ | PARITY$_{47}$ | PARITY$_{48}$ |

FIG. 4A

| DATA$_1$ | DATA$_2$ | DATA$_3$ | PARITY$_1$ | PARITY$_2$ | PARITY$_3$ |
|---|---|---|---|---|---|
| PARITY$_4$ | DATA$_4$ | DATA$_5$ | DATA$_6$ | PARITY$_5$ | PARITY$_6$ |
| PARITY$_7$ | PARITY$_8$ | DATA$_7$ | DATA$_8$ | DATA$_9$ | PARITY$_9$ |
| PARITY$_{10}$ | PARITY$_{11}$ | PARITY$_{12}$ | DATA$_{10}$ | DATA$_{11}$ | DATA$_{12}$ |
| PARITY$_{13}$ | PARITY$_{14}$ | PARITY$_{15}$ | PARITY$_{16}$ | PARITY$_{17}$ | PARITY$_{18}$ |
| PARITY$_{19}$ | PARITY$_{20}$ | PARITY$_{21}$ | PARITY$_{22}$ | PARITY$_{23}$ | PARITY$_{24}$ |
| PARITY$_{25}$ | PARITY$_{26}$ | PARITY$_{27}$ | PARITY$_{28}$ | PARITY$_{29}$ | PARITY$_{30}$ |
| PARITY$_{31}$ | PARITY$_{32}$ | PARITY$_{33}$ | PARITY$_{34}$ | PARITY$_{35}$ | PARITY$_{36}$ |
| PARITY$_{37}$ | PARITY$_{38}$ | PARITY$_{39}$ | PARITY$_{40}$ | PARITY$_{41}$ | PARITY$_{42}$ |
| PARITY$_{43}$ | PARITY$_{44}$ | PARITY$_{45}$ | PARITY$_{46}$ | PARITY$_{47}$ | PARITY$_{48}$ |

FIG. 4B

| PILOT$_1$ | DATA$_1$ | PARITY$_4$ | PARITY$_7$ | PARITY$_{10}$ | PARITY$_{13}$ | PARITY$_{19}$ | PARITY$_{25}$ |
|---|---|---|---|---|---|---|---|
| PARITY$_{31}$ | PARITY$_{37}$ | PARITY$_{43}$ | DATA$_2$ | DATA$_4$ | PARITY$_8$ | PARITY$_{11}$ | PARITY$_{14}$ |
| PILOT$_2$ | PARITY$_{20}$ | PARITY$_{26}$ | PARITY$_{32}$ | PARITY$_{38}$ | PARITY$_{44}$ | DATA$_3$ | DATA$_5$ |
| DATA$_7$ | PARITY$_{12}$ | PARITY$_{15}$ | PARITY$_{21}$ | PARITY$_{27}$ | PARITY$_{33}$ | PARITY$_{39}$ | PARITY$_{45}$ |
| PILOT$_3$ | PARITY$_1$ | DATA$_6$ | DATA$_8$ | DATA$_{10}$ | PARITY$_{16}$ | PARITY$_{22}$ | PARITY$_{28}$ |
| PARITY$_{34}$ | PARITY$_{40}$ | PARITY$_{46}$ | PARITY$_2$ | PARITY$_5$ | DATA$_9$ | DATA$_{11}$ | PARITY$_{17}$ |
| PILOT$_4$ | PARITY$_{23}$ | PARITY$_{29}$ | PARITY$_{35}$ | PARITY$_{41}$ | PARITY$_{47}$ | PARITY$_3$ | PARITY$_6$ |
| DATA$_{12}$ | PARITY$_{18}$ | PARITY$_{18}$ | PARITY$_{24}$ | PARITY$_{30}$ | PARITY$_{36}$ | PARITY$_{42}$ | PARITY$_{48}$ |

FIG. 4C

| PILOT$_1$ | PILOT$_2$ | DATA$_1$ | DATA$_2$ | DATA$_3$ | PARITY$_1$ | PARITY$_2$ | PARITY$_3$ |
|---|---|---|---|---|---|---|---|
| PARITY$_4$ | DATA$_4$ | DATA$_5$ | DATA$_6$ | PARITY$_5$ | PARITY$_6$ | PARITY$_7$ | PARITY$_8$ |
| DATA$_7$ | DATA$_8$ | DATA$_9$ | PARITY$_9$ | PARITY$_{10}$ | PARITY$_{11}$ | PARITY$_{12}$ | DATA$_{10}$ |
| DATA$_{11}$ | DATA$_{12}$ | PARITY$_{13}$ | PARITY$_{14}$ | PARITY$_{15}$ | PARITY$_{16}$ | PARITY$_{17}$ | PARITY$_{18}$ |
| PILOT$_3$ | PILOT$_4$ | PARITY$_{19}$ | PARITY$_{20}$ | PARITY$_{21}$ | PARITY$_{22}$ | PARITY$_{23}$ | PARITY$_{24}$ |
| PARITY$_{25}$ | PARITY$_{26}$ | PARITY$_{27}$ | PARITY$_{28}$ | PARITY$_{29}$ | PARITY$_{30}$ | PARITY$_{31}$ | PARITY$_{32}$ |
| PARITY$_{33}$ | PARITY$_{34}$ | PARITY$_{35}$ | PARITY$_{36}$ | PARITY$_{37}$ | PARITY$_{38}$ | PARITY$_{39}$ | PARITY$_{40}$ |
| PARITY$_{41}$ | PARITY$_{42}$ | PARITY$_{43}$ | PARITY$_{44}$ | PARITY$_{45}$ | PARITY$_{46}$ | PARITY$_{47}$ | PARITY$_{48}$ |

FIG. 4D

REVERSE LINK PILOT INTEGRATED WITH BLOCK CODES

CROSS REFERENCE TO RELATED APPLICATIONS

This application is a continuation of U.S. patent application Ser. No. 13/311,151, filed Dec. 5, 2011, which is a continuation of U.S. patent application Ser. No. 12/290,755, filed Nov. 3, 2008, which issued as U.S. Pat. No. 8,072,958 on Dec. 6, 2011, which is a continuation of U.S. patent application Ser. No. 10/874,101, filed Jun. 22, 2004, which issued as U.S. Pat. No. 7,447,187 on Nov. 4, 2008, which is a continuation of U.S. application Ser. No. 09/728,575, filed Nov. 30, 2000, which issued as U.S. Pat. No. 6,804,223 on Oct. 12, 2004, the contents of which are all hereby incorporated by reference herein.

BACKGROUND OF THE INVENTION

The present invention relates to communications systems and in particular to a scheme for digital encoding of signals in a wireless system.

Demand for wireless communications equipment and services continue to grow at an unprecedented rate throughout the world. Increasingly, such systems are commonly relied upon to provide voice and data communications to a growing sector of the public. While these systems originally depended upon analog signaling technology, there is essentially unanimous agreement that future systems will be based on various types of digital signal coding schemes.

The typical wireless communication system is a point to multi-point type system in which a central base station communicates with a number of remote units located within a local geographic area of coverage known as a cell. This system provides for duplex communication such that signals may be sent in both a forward direction (from the base station to the remote unit) as well as in a reverse direction (from the mobile remote unit back to the base station). In order to support communication between the remote unit and networks such as the Public Switched Telephone Network (PSTN), or data networks such as the Internet, the wireless system must also provide for various logical components and functional entities.

Consider the Code Division Multiple Access (CDMA) and Time Division Multiple Access (TDMA) digital systems presently in widespread use. Each of these systems provides for certain logical types of the radio channels that make up the forward link and reverse link. In particular, the forward link channels often include a pilot channel, paging channels, and multiple forward traffic channels. The traffic channels are used to carry the payload data between the base station and the mobile unit. A pilot channel is also typically required to allow the remote unit to maintain synchronization with the base station. The paging channels provide a mechanism for the base station to inform the remote unit of control information, such as the assignment of forward traffic channels to particular connections and/or subscriber units.

Likewise, an access channel is provided in the reverse direction in addition to reverse traffic channels. The access channels allow the remote units to communicate control information with the base station, such as to send messages indicating the need to allocate or deallocate connections as required.

Various environmental conditions will affect the performance of any wireless communications system. These elements include atmospheric signal path loss, which may often introduce fading and interference. Fading may include variations that are introduced as a result of the specific terrain within the cell, as well as other types of fading, such as multi-path fading, that occurs due to signal reflections from specific features, such as buildings that cause fluctuations in receive signal strength. Systems in which the remote unit may be a mobile unit, especially those potentially operating at higher speeds, such as the cellular telephones used in automobiles, are particularly susceptible to multi-path fading. In such an environment, the signal pathways are continually changing at a rapid rate.

Certain techniques can be used to attempt to eliminate the detrimental effects of signal fading. One common scheme is to employ special modulation and/or coding techniques to improve the performance in a fading environment. Coding schemes such as block or convolutional coding add additional parity bits at the transmitter. These coding schemes thus provide increased performance in noisy and/or fading environments at the expense of requiring greater bandwidth to send a given amount of information.

In addition, pilot signals may also be used to provide a reference for use in signal demodulation. For example, most digital wireless communications systems provide for a dedicated pilot channel on the forward link. This permits the remote units to remain in time synchronization with the base station. Certain systems, such as the IS-95 CDMA system specification promulgated by the Telecommunications Industry Association (TIA) use the pilot signals that include pseudorandom binary sequences. The pilot signals from each base station in such a system typically use the identical pseudorandom binary sequence, with a unique time offset being assigned to each base station. The offsets provide the ability for the remote stations to identify a particular base station by determining this phase offset in the forward link pilot channel. This in turn permits the remote units to synchronize with their nearest neighboring base station. Coding the pilot channel in this way also helps support other features, such as soft handoff for cell-to-cell mobility.

The pilot signal, having a predictable frequency and rate, allows the remote units to determine the radio channel transfer characteristics. By making such determinations, the receiver may in turn further compensate for the distortion introduced in the channel during the process of estimating symbols being received.

However, it is generally considered to be impractical to use pilot signals in the reverse link. In particular, this would lead to a situation where pilot signal channels would have to be dedicated for each remote unit. While this would not necessarily pose a problem in a point to point system, in point to multi-point systems such as a cellular telephone network, the architecture would quickly lead to inefficiency in use of the available radio spectrum. In addition, it is generally thought that the overhead associated with a system that assigned individual pilot channels to each remote unit would unnecessarily complicate the base station receiver processing.

An alternative to allocating individual pilot channels is to make use of a sequence of pilot symbols. The pilot symbols are interleaved with data symbols on the traffic channel. This technique is generally referred to as pilot symbol assisted modulation. In such a system, the transmitter encodes the data to be sent on the traffic channel as a series of symbols. A pilot symbol interleaver then inserts a sequence of predetermined pilot symbols within the data symbol sequence. The pilot symbol augmented sequence is then modulated and transmitted over the radio channel. At the receiving station, a decimeter or deinterleaver and filter separate the pilot symbols from the data symbols.

SUMMARY OF THE INVENTION

What is needed is a way to integrate pilot symbol assisted modulation techniques with block encoding schemes in a way which maximizes the probability that data and pilot symbols will be correctly received.

The invention accomplishes this with a pilot symbol insertion scheme that proceeds as follows. The source data bits are first augmented with periodically inserted pilot symbols. In a preferred embodiment, the pilot symbols are inserted at a position corresponding to a power of two, such as for example, every fourth, eighth, sixteenth, or thirty-second symbol. Next, this pilot symbol augmented data sequence is presented to a deterministic block coder. Such a block coder may, for example, be a sub-rate two dimensional turbo product coder.

The symbols of the resulting encoded block are then rearranged such that the pilot symbols will be in a predictable location. Because the pilot symbols are always in a known place in the input block coding matrix, their positions are therefore also known in the output block coding matrix. The encoded output pilot symbols can therefore be rearranged such that they are evenly distributed through the output coded space, prior to modulation and transmission.

An optional embodiment makes use of an interleaving scheme in which parity symbols are interleaved with data and pilot symbols. In such a scheme, all symbols from the coded space, with the exception of the pilot symbols, are placed in a temporary storage area by row. Data is then read out of the temporary storage area to provide the interleaved output, by reading data from the temporary array in column order. For example, a first pilot signal is selected, a row is read out, a second pilot signal is selected, a second row is read out, and so on. As a result, the pilot symbols are output at predetermined positions preferably located within symbol positions which are a power of two away from each other.

In an alternate embodiment, the symbols may be composed of pairs of input data bits, to form complex-valved symbols, which can then be modulated using Quadrature Phase Shift Keyed (QPSK) schemes. In this embodiment, the data, parity, and pilot bits are processed in pairs.

BRIEF DESCRIPTION OF THE DRAWINGS

FIG. 2 is a more detailed diagram of a transmit encoder and receive decoder;

FIGS. 3A and 3B illustrate how a deterministic block encoder, such as a one-quarter rate turbo product encoder, distributes data and parity bits in an output matrix;

FIGS. 3C and 3D illustrate how the pilot inserter and block encoder operate according to the invention;

FIG. 4A illustrates how a first type of interleaver outputs pilot, data, and parity bits;

FIGS. 4B and 4C illustrate how a second type of interleaver may order the data, parity, and pilot bits; and FIG. 4D illustrates how a third type of interleaver may order data, parity and pilot bits for use with a Quadrature Phase Shift Keyed (QPSK) type modulator.

Figure 1:
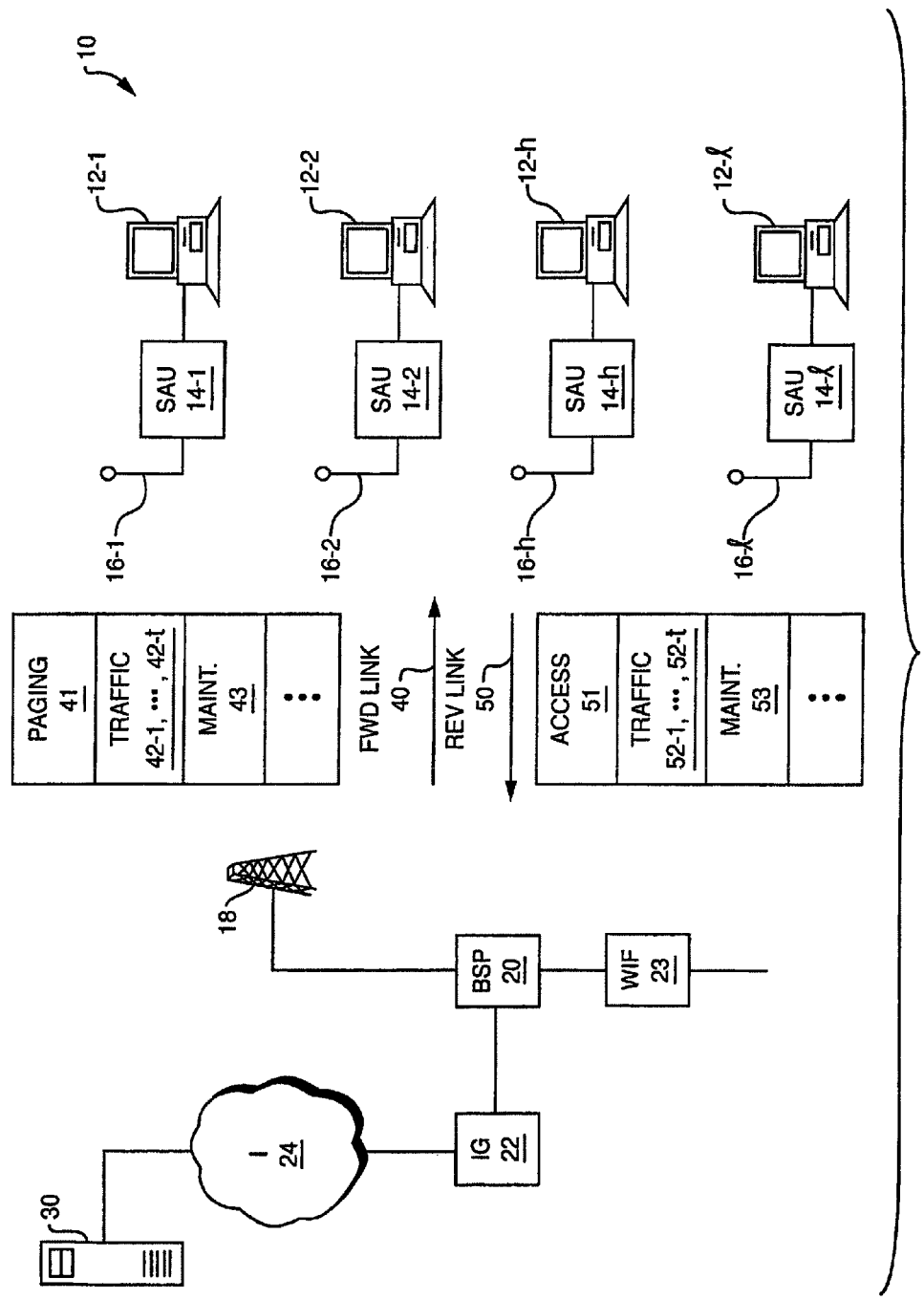
FIG. 1 is a block diagram of a communication system which encodes pilot symbols according to the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

While this invention has been particularly shown and described with references to preferred embodiments thereof, it will be understood by those skilled in the art that various changes in form and details may be made therein without departing from the scope of the invention encompassed by the appended claims.

FIG. 1 is a block diagram of a communication system 10 that interleaves pilot symbols with data symbols and uses a systematic block coder to ensure that the pilot symbols are located in predetermined locations. In the following description of a preferred embodiment, the communication system 10 is described such that the shared channel resource is a wireless or radio channel. However, it should be understood that the techniques described here may be applied to allow shared access to other types of media such as telephone connections, computer network connections, cable connections, and other physical media to which access is granted on a demand driven basis.

The communication system 10 includes a number of Personal Computer (PC) devices 12-1, 12-2, . . . 12-$h$, . . . 12-$l$, corresponding Subscriber Access Units (SAUs) 14-1, 14-2, . . . 14-$h$, . . . 14-$l$, and associated antennas 16-1, 16-2, . . . 16-$h$, . . . 16-$l$. Centrally located equipment includes a base station antenna 18, and a Base Station Processor (BSP) 20. The BSP 20 provides connections to and from an Internet gateway 22, which in turn provides access to a data network such as the Internet 24, and network file server 30 connected to the network 22. The system 10 is a demand access, point to multi-point wireless communication system such that the PCs 12 may transmit data to and receive data from network server 30 through bi-directional wireless connections implemented over forward links 40 and reverse links 50. It should be understood that in a point to multi-point multiple access wireless communication system 10 as shown, a given base station processor 20 typically supports communication with a number of different subscriber access units 14 in a manner which is similar to a cellular telephone communication network.

The PCs 12 may typically be laptop computers 12-1, handheld units 12-$h$, Internet-enabled cellular telephones or Personal Digital Assistant (PDA)-type computers. The PCs 12 are each connected to a respective SAU 14 through a suitable wired connection such as an Ethernet-type connection.

An SAU 14 permits its associated PC 12 to be connected to the network file server 30 through the BSP 20, gateway 22 and network 24. In the reverse link direction, that is, for data traffic traveling from the PC 12 towards the server 30, the PC 12 provides an Internet Protocol (IP) level packet to the SAU 14. The SAU 14 then encapsulates the wired framing (i.e., Ethernet framing) with appropriate wireless connection framing. The appropriately formatted wireless data packet then travels over one of the radio channels that comprise the reverse link 50 through the antennas 16 and 18. At the central base station location, the BSP 20 then extracts the radio link framing, reformatting the packet in IP form and forwards it through the Internet gateway 22. The packet is then routed through any number and/or any type of TCP/IP networks, such as the Internet 24, to its ultimate destination, such as the network file server 30.

Data may also be transmitted from the network file server 30 to the PCs 12 in a forward direction. In this instance, an Internet Protocol (IP) packet originating at the file server 30 travels through the Internet 24 through the Internet gateway 22 arriving at the BSP 20. Appropriate wireless protocol framing is then added to the IP packet. The packet then travels through the antenna 18 and 16 to the intended receiver SAU 14. The receiving SAU 14 decodes the wireless packet formatting, and forwards the packet to the intended PC 12 which performs the IP layer processing.

A given PC 12 and the file server 30 can therefore be viewed as the end points of a duplex connection at the IP level. Once a connection is established, a user at the PC 12 may therefore transmit data to and receive data from the file server 30.

The reverse link 50 actually consists of a number of different types of logical and/or physical radio channels including an access channel 51, multiple traffic channels 52-1, ... 52-t, and a maintenance channel 53. The reverse link access channel 51 is used by the SAUs 40 to send messages to the BSP 20 to request that traffic channels be granted to them. The assigned traffic channels 52 then carry payload data from the SAU 14 to the BSP 20. It should be understood that a given IP layer connection may actually have more than one traffic channel 52 assigned to it. In addition, a maintenance channel 53 may carry information such as synchronization and power control messages to further support transmission of information over the reverse link 50.

Similarly, the forward link 40 typically includes a paging channel 41. The paging channel 41 is used by the BSP 20 to not only inform the SAU 14 that forward link traffic channels 52 have been allocated to it, but also to inform the SAU 14 of allocated traffic channels 52 in the reverse link direction. Traffic channels 42-1 ... 42-t on the forward link 40 are then used to carry payload information from the BSP 20 to the SAUs 14. Additionally, maintenance channels carry synchronization and power control information on the forward link 40 from the base station processor 20 to the SAUs 14.

In the preferred embodiment, the logical channels 41-43 and 51-53 are defined by assigning each channel a unique pseudorandom channel (PN) code. The system 10 is therefore a so-called Code Division Multiple Access (CDMA) system in which channels assigned to unique codes may use the same radio carrier frequency. The channel may also be further divided or assigned. Additional information as to one possible way to implement the various channels 41, 42, 43, 51, 52, and 53 is provided in Patent Cooperation Treaty Application No. WO 99/63682 entitled "Fast Acquisition Of Traffic Channels For A Highly Variable Data Rate," assigned to Tantivy Communications, Inc., and published Dec. 9, 1999. In a preferred embodiment, the channel codes are a type of PN code which repeats at a code length of $2^N$. One such orthogonal PN code scheme is described in U.S. patent application Ser. No. 09/255,156, filed Feb. 23, 1999, entitled "Method and Apparatus for Creating Non-Interfering Signals Using Non-Orthogonal Techniques", assigned to Tantivy Communications, Inc.

Turning attention now to FIG. 2 there is shown a generalized block diagram of the encoding process at the transmit side and decoding process at the receive side according to the invention. It should be understood that the invention is implemented on the reverse link 50, so that the transmitter 100 may typically be one of the SAUs 14 and the receiver is the Base Station Processor (BSP) 20. However, in other implementations it is possible for the invention to be applied on the forward link 40, in which case the transmitter is implemented in the BSP 20 and the receivers is the SAUs 14.

In any event, a transmitter 100 is implemented with a pilot inserter 110, block encoder 120, pilot interleaver 130, channel coder 140 and radio frequency (RF) modulator 150. The receiver 200 includes an RF demodulator 250, channel decoder 240, pilot deinterleaver 230, block decoder 220, pilot removal 210, and pilot reference generator 205.

It should be understood that the receiver 200 performs the inverse functions of the corresponding portions of the transmitter 100. In such an instance, the RF demodulator 250 performs the inverse radio frequency to modulation process, the channel decoder 240 decodes the channel codes reversing the operation of the channel coder 140, the pilot deinterleaver 230 performs the inverse function of the specific pilot interleaver 130 implemented in the transmitter, and the block decode process 220 also undoes the block encode process 120. The pilot removal process 210 uses a pilot reference signal generator 205, for example, to multiply the received data in pilot stream via reference pilot signal to further aid in the recovery of the data. A pilot inserter 110 typically makes sense in the reverse link 50 given and that pilot symbols are preferably inserted with the data symbols or bits in this same channel. This is opposed to an arrangement where there are separate pilot channels devoted separately for simply sending pilot signals, which is typically more practical on the forward link 40, in which case a single pilot channel can be associated with and be shared by numerous SAUs 14.

Before discussing the details of the pilot inserter 110 and block encoder 120 in more detail, it is instructed to consider the operation of a typical error coding process. In particular, consider an example situation in the use of a turbo product code which is to encode data at the rate of ¼. (We assume in the discussion of this first embodiment that data is real-valued only such that a "symbol" is a single data bit, and discuss a situation with complex-valued data symbols later on.) In the case shown in FIG. 3A, the input data bits data1, data2 ... data16 may thought of as being placed in the upper left hand corner of a matrix encoding space. Because the code is a ¼ rate code, the matrix encoding space consists of a matrix which is four times the size of the input data matrix space. In the current example the input data matrix space is 4×4, and the coded space is a matrix of 8×8.

For a typical prior art block coding operation, that is one without supplementation with pilot symbols according to the invention, the 16 input data bits are placed in an upper left hand corner of the 8×8 encoded space as shown in FIG. 3A.

The encoded matrix is then presented to the block encoder to calculate and create the parity bits for an encoded space. In the example being discussed, in the case of a ¼ rate code, three times as many parity bits as data bits are calculated and created as shown in FIG. 3B. This type of systematic turbo product code, is considered to be deterministic in the sense that input data bits appear in the same position in the output matrix as they do in the input matrix, with all of the parity bits taking up the other spaces in the matrix.

Returning attention to FIG. 2, the pilot inserter 110 and block encoder 120 can now be understood more particularly. In the pilot insertion scheme employed by the pilot inserter 110, some of the input data symbols are replaced with pilot symbols. In the preferred embodiment, the goal is to have pilot symbols make up approximately 6.25% of the data symbols sent on the channel after encoding. That means for every 64 channel symbols there needs to be 4 pilot symbols inserted into the information space.

Turning attention to FIG. 3C, we see that in considering a group of 16 data symbols, 4 of the symbols will be replaced with pilot symbols such that the input matrix becomes as shown. Thus a pilot symbol, pilot1, is followed by three data symbols, data1, data2, data3. The next pilot symbol, pilot2, is followed by data symbols data4, data5, data6 and so on.

As in the case of the standard turbo product code, the matrix in FIG. 3C is then presented to the block encoder 120 to create the encoded space shown in FIG. 3D. The parity symbols of this example will, in fact, be different from those for the situation where the non-inserted information space because the information space has changed between the two examples. In particular, of course, the information space in FIG. 3C is different from the information space in FIG. 3A, and so the parity symbols parity$_1$, parity$_2$ . . . parity$_{48}$ are different. What is important to note here is that the pilot symbols pilot$_1$, pilot$_2$, pilot$_3$ and pilot$_4$ are still in the same identifiable positions in the matrix.

It is the job of the pilot interleaver 130 to rearrange the output matrix in such a manner that the pilot symbols are evenly distributed among the data and parity symbols in a manner which makes sense. In the simplest instance, the data and parity symbols can be placed on the channel in, more or less, the order in which they appear in the matrix. This situation is shown in FIG. 4A. In particular, it is noted that the pilot symbols pilot1, pilot2, pilot3 are redistributed through the matrix so that they are read out once every 16 bits, or 6.25% of the time, as desired. The matrix can thus be interpreted as a set of instructions for ordering the output bits, by reading along the first row, and then reading the bits out along the second row, and then also the third row, and so on.

In certain other instances it is important to interleave the parity symbols among the pilot and data symbols as well. In this situation, the parity symbols and data symbols can be better distributed throughout the information space. In this approach, all except the pilot symbols may be placed in a temporary storage area 180 in row order fashion and then read out by column order. The goal in allocating rows and columns in the temporary storage area 180 is to remain as square as possible. Thus, in the example illustrated shown in FIG. 4B, the data and parity symbols are first read out from a first row of the coded output matrix in FIG. 4A, while saving the pilot symbols in another temporary storage area. The result is a matrix having the data1, data2, data3, parity1, parity2, parity3 . . . parity47, parity48 symbol arrangement as shown. Data is then read out of this temporary storage area 180 by reading out the non-pilot symbols in column order. Thus, for example, as shown in FIG. 4C, a first pilot symbol is read out of the pilot matrix, and then fifteen symbols are read from the non-pilot storage area (data1, parity4, parity7, parity10, and so on) resulting in the order of symbols shown in the first row of FIG. 4C. This results not only in the pilot symbols continuing to be distributed once every 16 symbols, but also in a situation such that the data symbols are more evenly disbursed throughout the encoded space.

In yet another example of the implementation of the interleaver 130, it may be advantageous to apply data to the channel with Quadrature Phase Shift Keyed (QPSK) format modulation. In this case, individual input data bits are read in pairs so that for example, 2 pilot bits are required to make up respectively the In-phase (I) and the Quadrature (Q) portion of a complex valued data symbol. In this case, pilot bits are also read out in pairs so that two pilot bits comprise a pilot symbol. The result, as shown in FIG. 4D, is a situation in which pilot symbols (consisting of a pilot$_1$ and pilot$_2$ bit) still appear every 16 symbols or 6.25% of the time.

Using the systematic block encoder, the position of the pilot, information, and parity symbols is always known in the output matrix. This creates a structure where pilot symbols can be repositioned in a known fashion, to ensure that they repeat in a regular pattern in the modulated output signal.

For example, a system timing requirement may demand that the ratio of pilot symbols to the ratio of data and parity symbols remain at a power of two, so that clock phasing requirements are much easier to meet. In particular, even if a block encoder produces a number of data and parity symbols as a power of 2, the additional pilot symbol insertions would create an output sequence which is not an exact power of 2. This makes it difficult to insert pilot symbols in blocks which do not remain in phase, and therefore "roll" with respect to the PN sequences used with respective channel encoding 140. For example, in a case where pilot symbols need to be inserted 6.25% of the time, a block of 4096 would require 4096 for data and parity, plus 6% of 4096, or 256 symbols for pilots for a total of 4352 symbols per block. Because no PN channel code is such a length, to maintain synchronization, the position of the PN code would change at the start of every symbol block. However, with the invention, this difficulty is avoided, and the output symbol blocks are easily contrived to be in groups of 2N, including both parity and pilot symbols. Thus, PN code synchronization timing, as required to maintain the proper spread spectrum characteristics, is easy.

What is claimed is:

1. A base station comprising:
a processor configured to produce first symbols derived from data bits and parity bits;
the processor configured to distribute reference symbols among the first symbols in a predetermined pattern; wherein the reference symbols are spaced by a same number of symbols of a plurality of first symbols; wherein the reference symbols are not adjacent to each other; and
a transmitter configured to transmit a wireless signal including the reference symbols distributed among the first symbols.

2. The base station of claim 1, wherein the reference symbols are pilot symbols.

3. The base station claim 1, wherein the first symbols are quadrature modulated.

4. The base station claim 1, wherein the first symbols are produced by turbo coding the data bits.

5. A method for use in a base station, the method comprising:
producing first symbols derived from data bits and parity bits;
distributing reference symbols among the first symbols in a predetermined pattern; wherein the reference symbols are spaced by a same number of symbols of a plurality of first symbols; wherein the reference symbols are not adjacent to each other; and
transmitting a wireless signal including the reference symbols distributed among the first symbols.

6. The method of claim 5, wherein the reference symbols are pilot symbols.

7. The method claim 5, wherein the first symbols are quadrature modulated.

8. The method claim 5, wherein the first symbols are produced by turbo coding the data bits.

9. A wireless communication unit comprising:
a receiver configured to receive a wireless signal, wherein the wireless signal includes first and reference symbols; wherein the reference symbols are distributed among the first symbols in a predetermined pattern; wherein the reference symbols are spaced by a same number of symbols of a plurality of first symbols; wherein the reference symbols are not adjacent to each other; and a processor configured to demodulate the first symbols using the reference symbols, wherein the first symbols are derived from data bits and parity bits.

10. The wireless communication unit of claim 9, wherein the reference symbols are pilot symbols.

11. The wireless communication unit claim 9, wherein first symbols are quadrature modulated.

12. The wireless communication unit claim 9, wherein the first symbols are produced by turbo coding the data bits.

* * * * *